Sept. 30, 1952     H. O. NILSSON ET AL     2,612,047
PROBE DEVICE FOR FLUID CONDITION MEASURING APPARATUS
Filed Feb. 10, 1949
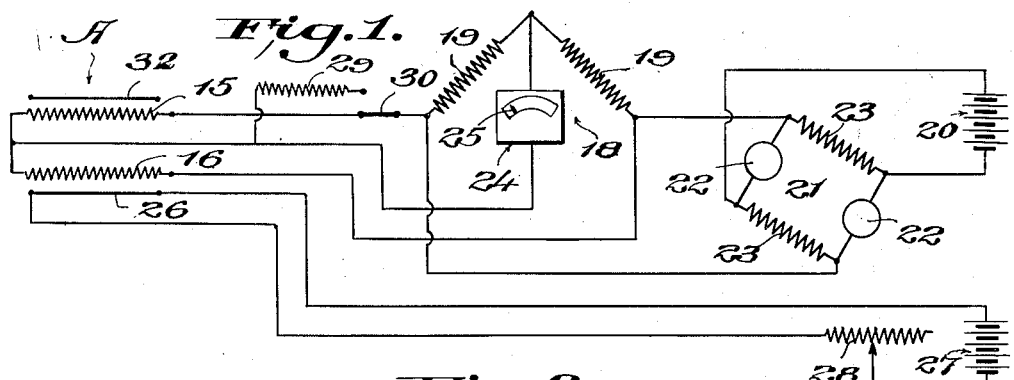
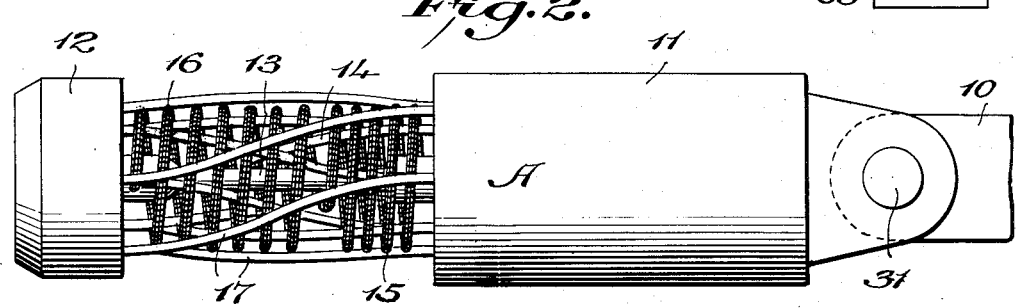
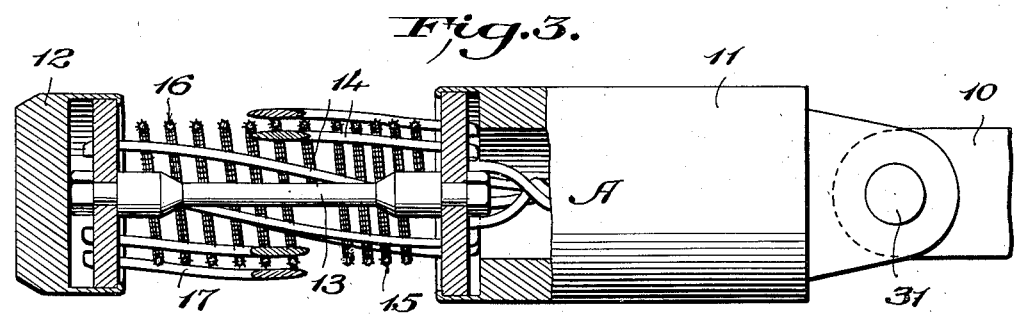
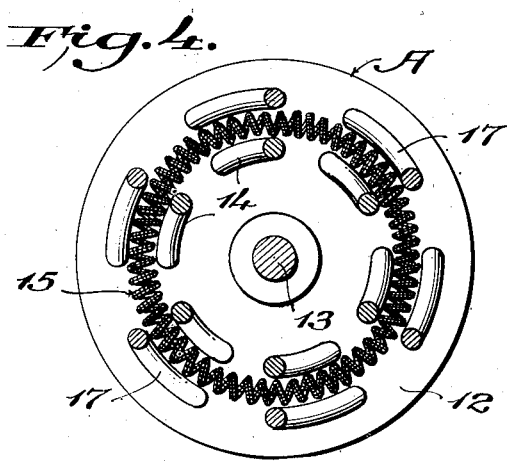
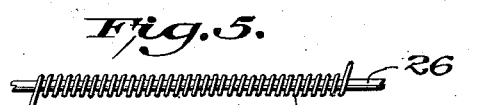
Inventors
Henry O. Nilsson,
Leonard R. Phillips,
By Carroll Bailey
Attorney Patented Sept. 30, 1952

2,612,047

UNITED STATES PATENT OFFICE 2,612,047

PROBE DEVICE FOR FLUID CONDITION MEASURING APPARATUS

Henry O. Nilsson, Centerport, N. Y., and Leonard R. Phillips, Teaneck, N. J., assignors to Anemostat Corporation of America, New York, N. Y., a corporation of Delaware Application February 10, 1949, Serial No. 75,666

2 Claims. (Cl. 73—362)

This invention relates to electrical apparatus for measuring certain conditions, such as the velocity and the temperature, of fluids such as air, and has particular reference to improvements in such apparatus which function to accomplish their purposes by indicating the change in the electrical resistance of an element resulting from a change in its temperature brought about by exposing the same to a fluid the velocity or the temperature of which is to be measured. In this connection it is known that certain materials have a positive temperature coefficient of electrical resistance; i. e., that their electrical resistance varies fairly uniformly with variations in their temperatures, and that, if an element formed from some such material is exposed to a fluid the velocity or the temperature of which is to be measured, the change in the electrical resistance of the element brought about by its exposure to the fluid will be a fairly accurate indication of the velocity or of the temperature of the fluid, depending upon which is being measured.

In electrical measuring apparatus of the character referred to, the sectional area and the amount of surface area of the element that is exposed to the fluid determines the sensitiveness of said element to temperature change by the fluid and, hence, the ability of the aparatus to measure with exactness the velocity or the temperature of the fluid. In other words, the lesser the sectional area and the greater the surface area of the element, the more sensitive it is to changes in temperature by the fluid to which it is exposed and the greater the accuracy of the apparatus in indicating the velocity or the temperature of the fluid. Consequently, in measuring apparatus of the character referred to, especially for measuring very low fluid velocities and exact temperatures, a most important consideration is that the element which is exposed to the fluid shall have the least practicable sectional area and the greatest practicable surface area. Also of great importance is that said element shall be compact so as to occupy as little space as possible in order that it may be used advantageously in small, confined spaces.

Accordingly, one special and important object of the present invention is to provide an element such as referred to which has a very small sectional area and an exceptionally large surface area commensurate with the space it occupies.

Another special and important object of the invention is to so construct and mount an element such as referred to that for various different attitudes of the same relative to the direction of flow of a fluid to which it may be exposed, it will have substantially the same large surface area thereof exposed to the fluid, whereby there is avoided any need of special care in positioning said element in a fluid stream the velocity of which is to be measured.

In order that an element such as referred to may be employed with facility for measuring the velocities of fluids at different temperatures, it is usual to heat the element above the temperature of the fluid in order readily to establish a zero point from which to measure the velocity. Accordingly, another special and important object of the invention is to combine heating means with said element in a highly efficient, compact manner.

In connection with the employment of an element of the character mentioned for measuring the velocities of fluids at different temperatures, it is desirable to employ a companion, non-heated, temperature-compensating element. Accordingly, another object of the present invention is to provide a temperature-compensating element of novel small sectional area, large surface area, compact form and to arrange it in a compact manner relative to the heated element.

With the foregoing and other objects in view which will become more fully apparent as the invention is better understood, the latter consists in apparatus of the character stated embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a diagrammatic view of a measuring apparatus constructed in accordance with the invention.

Fig. 2 is a side elevation of the probe device of the apparatus.

Fig. 3 is a longitudinal section through the probe device.

Fig. 4 is a transverse section through the probe device.

Fig. 5 is an elevation illustrating the first step employed in forming each of the resistance elements of the probe device; and Fig. 6 is a fragmentary perspective view illustrating the second step employed in forming each of the resistance elements of the probe device.

Referring to the drawings in detail, A designates, generally, a probe device which is mounted upon a handle 10 whereby it may readily be handled and introduced into a fluid the velocity or the temperature of which is to be measured.

The probe device A comprises a base 11; a head 12 axially alined with said base and spaced therefrom; a central post 13 connecting said base and said head rigidly together; an annular set of spaced apart resistance element supporting rods 14 extending between and mounted at their ends in said base 11 and said head 12; a pair of positive temperature coefficient of resistance wires 15 and 16 formed, for example, of nickel and wound helically upon said rods 14, and an annular set of spaced apart protecting rods 17 for said wires 15 and 16 disposed outwardly of the latter and extending between and mounted at their ends in said base 11 and said head 12.

Fig. 1 of the drawings illustrates conventionally and by way of example an electrical system of which the probe device A may constitute a part for effecting measurements such as the velocity or the temperature of a fluid such as air. The two wires 15 and 16 of said probe device constitute two arms of a Wheatstone bridge 18, the other two arms 19, 19 of which are composed of windings of a material such as manganin which has a zero temperature coefficient of electrical resistance; i. e., the electrical resistance of which remains substantially constant regardless of variations in its temperature. The bridge 18 is energizable by a battery 20 through a regulating device 21 which may consist, for example, of two tungsten filament lamps 22 and two wire resistors 23 connected in the form of a bridge and which acts to compensate for any changes in voltage of the battery 20 so as to maintain a constant impressed voltage on the bridge 18.

Across the bridge 18 is connected a suitable current flow indicating instrument 24 which includes a suitable indicator element 25. One of the wires 15 or 16, the wire 16, for example, is to be artificially heated and to this end an electrical heating element 26 for said wire 16 may derive its heating current from a battery 27 through a rheostat 28. The bridge 18 is balanced when the two arms 15 and 16 thereof are at the same temperature.

To use the apparatus for measuring, for example, the velocity of a fluid such as air, the circuit including the bridge 18 and the battery 20 is closed to energize the bridge circuit. The circuit of the heating element 26 is then closed with the result that the wire 16 is heated and unbalances the bridge 18. Then, while the wires 15 and 16 are subjected to a condition of zero air flow, the flow of current through the said heating element 26 is regulated to cause a definite amount of deflection of the indicator element 25 of the instrument 24. The wires 15 and 16 then are exposed to the fluid the velocity of which is to be measured. Flow of the fluid over the wire 16 will effect cooling of the same and decrease its electrical resistance proportionately to the velocity of the fluid. With decrease in the resistance of said wire 16 the bridge will tend to assume its balanced condition and this will be reflected in return movement of the indicator element 25 from its deflected position. The deflected position of said indicator element 25 corresponds, of course, to zero velocity of the air. Consequently, the amount of movement of said indicator element from its deflected position is a measure of the velocity of the air. To indicate the velocity the instrument 24 may, of course, be provided with suitable calibrations.

If only the wire 16 should be exposed to the fluid the velocity of which is being measured, different temperatures of the fluid acting upon said wire 16 might disturb the balance of the bridge 18. Since, however, the wire 15 also is exposed to the fluid, it acts with reference to the wire 16 as a compensator for differing temperatures of the fluid being measured to prevent unbalancing of the bridge 18 by differing temperatures of the fluid. By varying the degree of heating of the wire 16, the apparatus may be used for measuring various different ranges of fluid velocities.

To use the apparatus for measuring the temperature of a fluid, a wire 29 having a zero temperature coefficient of resistance is substituted for one of the wires 15 or 16, for the wire 15 for example as by means of a switch 30. During manufacture of the apparatus and while the wire 29 is substituted for the bridge arm 15, the apparatus is adjusted so that the indicating element 25 assumes some definite position when the bridge arm 16 is at some given basic temperature. Consequently, to measure temperature, all that is necessary is to substitute the wire 29 for the bridge arm 15 and to expose the unheated bridge arm 16 to the fluid the temperature of which is to be measured. The change in temperature and hence, in the resistance of the wire 16 will disturb the bridge 18 and result in deflection of the indicating element 25. The amount of deflection of said indicating element from its definite position corresponding to said basic temperature then will be a measure of the difference between said basic temperature and the temperature of the fluid. The instrument 24 may, of course, be calibrated in terms of temperature.

As will be apparent from the foregoing, the longer and the finer the wires 15 and 16 may be, the more sensitive and accurate will be the described apparatus in measuring fluid velocities and temperatures. However, it is very desirable that the probe device A shall be as small as practicable in order that it may be used in small and inaccessible places. Therefore, the primary aim of the present invention has been to devise a probe device which, for any given small size thereof shall have embodied therein resistance wires 15 and 16 of the least practicable gauge and the greatest practicable length. To this end and in accordance with the invention, the element 26 for heating the wire 16 is in the form of a core wire around which the wire 16 is wound, as illustrated in Fig. 5 of the drawings. After the wire 16 has been wound upon the core or heater wire 26 the resulting assembly of the two wires 16 and 26 is wound helically as illustrated in Fig. 6 of the drawings. The helical winding as illustrated in Fig. 6 then is wound helically upon the supporting rods 14 as illustrated in Figs. 2, 3 and 4 of the drawings. The result is that the resistance wire 16 is combined in a very compact and effective heat-exchange manner with the heater wire 26 and that the wire 16 occupies little space commensurate with its length and sectional area.

The resistance wire 15 preferably is wound in the same manner as the wire 16; i. e., first upon a core wire 32, then helically as in the second step of winding the wire 16, and finally helically about the supporting rods 14, so that it, too, occupies little space commensurate with its length and sectional area. In this connection, while the core wire 32 is not essential and may be dispensed with if desired, it preferably is employed as a stabilizing and supporting means for the resistance wire 15. The core wire 26, besides constituting a heating element, serves also as a stabilizing and supporting means for the resistance wire 16.

Obviously, instead of the wires 15 and 16 being wound helically upon supporting rods such as the rods 14, they may extend or be wound in serpentine manner from end to end of the probe device A or may be mounted upon said probe device in any other suitable manner best adapted to permit said wires to be of greatest length within the limitations of space imposed by the size of the probe device.

In practice, the core wires 26 and 32 may appropriately be of about .003 inch in diameter; the resistance wires 15 and 16 are quite fine and may be of about .0015 inch in diameter; the final helical windings about the supporting rods 14 may have outside diameters of about one-half of an inch; the portion of the probe device occupied by the two wires 15 and 16 may be of about one inch in length; and there may be about seven turns of the wire 16 and about five turns of the wire 15 about the supporting rods 14. It is to be understood, however, that these dimensions merely are suggestive and by no means limiting since they may be varied to suit whatever may be considered to be a practical over-all length and diameter of the probe device for any particular use. In order, however, that the probe device may be used in small spaces or spaces which are difficult of access, it ordinarily is made as small as practicable and therefore the wires 15 and 16 are of as small gauge and as long as practicable and the helical windings thereof are of least practical diameters.

The wire 16 is, of course, electrically insulated from the core or heater wire 26, but it is in thermal contact therewith or in close heat-exchange relationship thereto. Moreover, the turns of the wire 16 about the core or heater wire 26 are suitably spaced apart to permit air or other fluid freely to flow over and effect a rapid rate of cooling of said wire 16, as well as to insure against any possibility of flow of current other than serially through the turns of said wire 16.

Preferably the probe device A is pivotally mounted upon the handle 10, as indicated at 31, for angular adjustments relative thereto. Preferably, too, the rods 14 and 17 extend helically relative to the probe device A so that regardless of the attitude of said probe device relative to the direction of flow of the fluid being measured, no two or more of said rods may be disposed in overlapping or such other relationship to each other throughout their lengths as to constitute in effect a single barrier to flow of fluid over the wires 15 and 16.

From the foregoing description considered in connection with the accompanying drawings it is believed that the construction and mode of operation of the present measuring apparatus will be clearly understood and its advantages appreciated. It is desired to point out, however, that while only a single, specific structural embodiment of the invention has been illustrated and described, the same is readily capable of specifically different structural embodiments within its spirit and scope as defined in the appended claims.

We claim:

1. In measuring apparatus of the character described, a probe device including an electrical resistance wire to be exposed to a fluid for temperature change by the latter and to constitute an arm of a Wheatstone bridge for indicating change in the electrical resistance of said wire due to temperature change thereof, said probe device comprising a base, a head axially alined with and spaced from said base, a plurality of spaced apart rods connecting said head and said base, said rods being disposed helically with respect to said head and base, said wire having an initial helical winding, a helical winding of said initial helical winding, and a helical winding of said second mentioned helical winding upon said rods, all of said windings being substantially completely exposed to fluid flow about said device.

2. In measuring apparatus of the character described, a probe device including an electrical resistance wire to be exposed to a fluid for temperature change by the latter and to constitute an arm of a Wheatstone bridge for indicating change in the electrical resistance of said wire due to temperature change thereof, said probe device comprising a base, a head axially alined with and spaced from said base, and a plurality of spaced apart rods connecting said head and said base, said rods being disposed helically with respect to said head and base and said wire being wound about said rods.

HENRY O. NILSSON.
LEONARD R. PHILLIPS.

REFERENCES CITED

The following references are of record in the file of this patent:

UNITED STATES PATENTS

| Number | Name | Date |
| --- | --- | --- |
| 688,995 | Gold | Dec. 17, 1901 |
| 1,019,075 | Nuckols et al. | Mar. 5, 1912 |
| 1,724,206 | MacGregor-Morris | Aug. 13, 1929 |
| 1,902,427 | Sawyer | Mar. 21, 1933 |
| 2,149,448 | Lederer et al. | Mar. 7, 1939 |

FOREIGN PATENTS

| Number | Country | Date |
| --- | --- | --- |
| 100,966 | Great Britain | Aug. 19, 1920 |
| 302,263 | Germany | Apr. 6, 1916 |